Nov. 28, 1933.　　　H. W. ZIMMERMAN　　　1,936,612
PISTON PIN BEARING HONE
Filed July 29, 1929
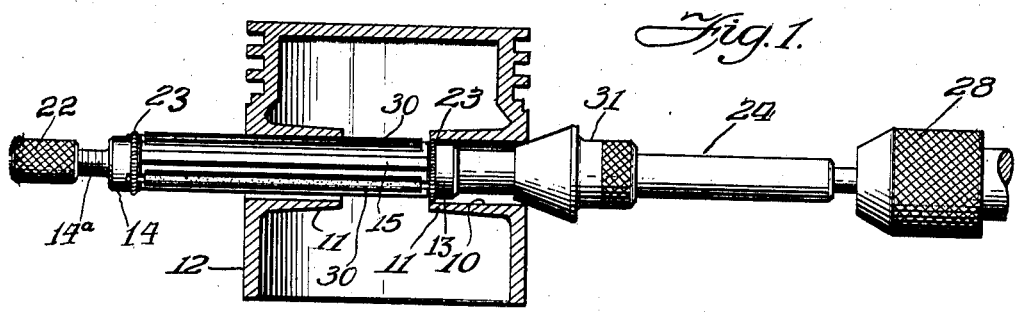
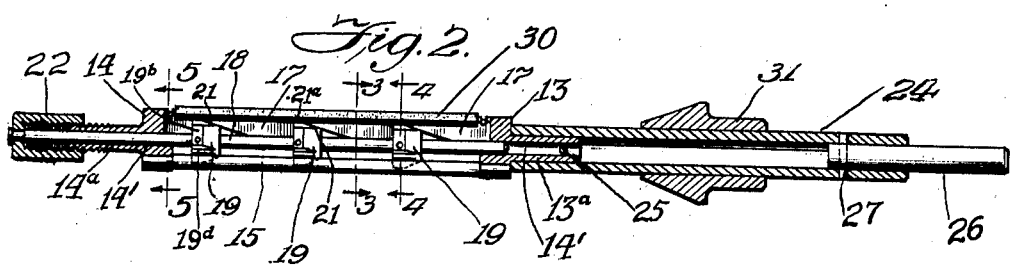
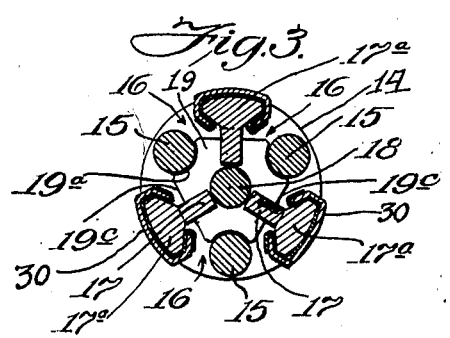 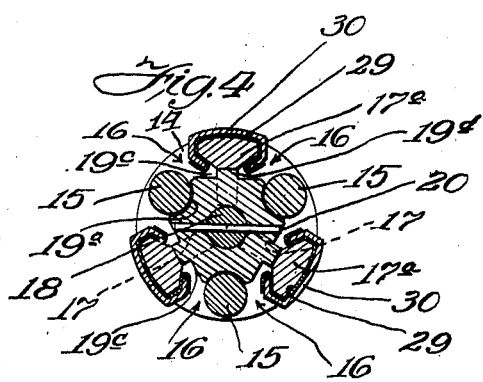
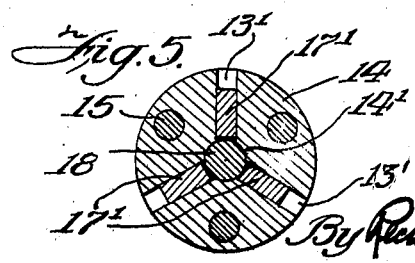
 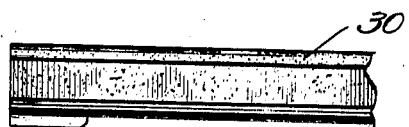
Inventor
Herman W. Zimmerman
By Rector, Hibben, Davis & Macauley
Attys.

Patented Nov. 28, 1933

1,936,612

UNITED STATES PATENT OFFICE 1,936,612

PISTON PIN BEARING HONE

Herman W. Zimmerman, Chicago, Ill., assignor to Automotive Maintenance Machinery Co., Chicago, Ill., a corporation of Illinois Application July 29, 1929. Serial No. 381,861

17 Claims. (Cl. 51—184.3)

My invention relates generally to abrading tools, and has to do particularly with a tool of this character adapted for the honing or dressing of the piston pin bearings of pistons and connecting rods of internal combustion engines.

My invention has utility in the honing of bearings of the foregoing character used in connection with automobile engines and, to facilitate explanation of my invention, I will refer to the same in its application to that use.

Two forms of piston pin mountings are ordinarily used in automotive construction,—one wherein the pin is rotatably mounted in its piston bearing with the connecting rod fixedly secured thereto, and the other wherein the piston pin is fixed to the piston and the connecting rod is rotatably mounted upon the pin. In both of these forms, it is highly desirable that the piston pin bearing be smooth presenting a true and maximum bearing surface. Heretofore, it has been customary, say in the fitting of new (oversize) pistons, to use a reamer to bring the piston pin bearings in the piston (which in new pistons are undersize) to the desired size to receive the piston pin. In the use of a reamer (even in the hands of a skilled mechanic), the wall surface of the bearing bore reamed is necessarily jagged presenting alternate high and low spots, so that when the true-ground pin is inserted in its bearing it engages only the high spots thereof. Practical demonstration has shown that the maximum bearing surface for the pin under such cases does not ordinarily exceed forty percent of the entire bearing surface. This necessarily results in quick wearing out of the pin bearing thereby causing knocks, rattles and other objectionable conditions which are prohibitive in high efficiency engine-operation. The foregoing conditions also exist in the second form of pin mounting where the connecting rod bearing is reamed to fit the pin. Further, the foregoing is true in the fitting of a new piston pin to an old piston or connecting rod. That is to say, the piston pin bearing in the piston or connecting rod must be dressed to smooth the same and to bring it to the proper size for fitting of an oversize piston pin; and this dressing cannot be properly done with a reamer as has been the prior practice.

The principal object of my invention is to provide a piston pin bearing dressing tool which, in the dressing of the piston pin bearings of either an old or new piston or connecting rod, will give the same a true and smooth bearing surface adapted to be engaged uniformly substantially throughout by the piston pin, thereby reducing wear to a minimum and materially increasing the life of the piston pin and its bearing.

Another object is to provide a simple, efficient and inexpensive tool of the foregoing character which may be readily used by an unskilled mechanic and which is of a character to materially hasten the dressing of the piston pin bearing, thereby reducing maintenance costs of internal combustion engines.

A further object is to provide adjustable means for accurately positioning and aligning the dressing tool in the piston pin bearing and for maintaining the same in proper aligned position with respect to the bearing during the dressing or honing operation. In some instances it may be desirable to have the dressing tool stationarily supported while the bearing is moved backward and forward relative thereto, and in other instances the piston or the connecting rod may be stationarily supported while the tool is moved backward and forward; and in both of these instances my invention provides for accurate guidance and alignment of the tool in the bearing so that a trueround bearing surface will always be provided.

Still another object of my invention is to provide a tool of the foregoing character which includes a comparatively long and slender body of cage construction for adjustably supporting abrasive carriers, this cage-body being braced against torsional strains and stresses to prevent twisting or distortion of the abrasive members during the grinding operation. More particularly, my invention contemplates the use of cone-spreading, or similar, means for expanding the abrasive carriers toward the bearing wall surface to be dressed, and this cone-spreading means is so associated with the cage-body that the former is confined to movement axially of the tool and such arrangement also serves to brace and render the cage-body and cone-spreading means, in its entirety, a substantially rigid unit which will withstand the torsional strains and stresses imposed during the grinding operation.

An additional object is to provide means for adjusting the abrasive carriers, which means is readily accessible during the grinding operation and which may be adjusted during the grinding operation without removing the tool from the bearing being dressed.

A further object is to provide an improved abrasive unit which includes a metal support adapted to receive and hold an abrasive material such as emery cloth, etc., and which is of such inexpensive construction that the entire unit when worn out may be discarded and a new unit substituted therefor. My invention further contemplates the use of a metal abrasive support which is readily attachable to and removable from the adjustable abrasive carrier and which provides a solid and smooth backing for the abrasive material, throughout its wall-engaging surface. Further, the abrasive material is of a somewhat elastic nature and may stretch under certain operating conditions, and my invention provides an abrasive support to which the abrasive material is securely clamped so that it will not loosen under stretching and other conditions; thusly, insuring proper abrading operation at all times.

Other objects and advantages will become apparent as this description progresses and by reference to the drawing wherein,—

Figure 1 is an elevational view, partially in section, showing one form of tool embodying my invention and illustrating its application to the pin bearing of a piston;

Fig. 2 is a longitudinal section through the tool of Fig. 1;

Fig. 3 is an enlarged section taken substantially on line 3—3 of Fig. 2;

Fig. 4 is an enlarged section taken substantially on line 4—4 of Fig. 2;

Fig. 5 is an enlarged section taken substantially on line 5—5 of Fig. 2;

Fig. 6 is an enlarged side elevation of a portion of one of the abrasive units; and Fig. 7 is a transverse section taken through the abrasive unit of Fig. 6.

It will be understood that, while I have illustrated, and will describe, my invention in its adaptability to the dressing of piston pin bearings for automobile engines, it may be used in other instances where similar conditions and problems exist.

In Fig. 1 of the drawing, I have shown a tool embodying my invention in position for dressing the piston pin bearing 10 provided in the piston bosses 11 of the conventional form of piston 12. This tool (Figs. 2–5) comprises a body of cage construction including end or guide plates 13 and 14 which are rigidly joined together by a plurality (preferably, but not necessarily, three) equally-spaced circular posts or rods 15, the latter being securely fastened at their ends to the end plates. The spaces between the posts 15 provide carrier-ways 16 (Figs. 3 and 4) for the abrasive carriers 17 (none of which are disposed diametrically opposite) which are adjustable toward and from the bearing wall surface to be honed or dressed as will now be described.

Each abrasive carrier receives sliding guidance wholly from the end or guide plates 13 and 14. Specifically, referring to Fig. 5, each of the end plates has radial guide-grooves or channels 13' (corresponding in number to the carriers 17) cut therein, and extending from the axial bores 14' therein to the outer edges thereof, to receive slide-tongue portions 17' constituting the ends of the carriers 17, these engaging parts being machined for requisite snug sliding fit. The foregoing structure in one end plate only has been illustrated in detail (Fig. 5) since both of the end plates are similar in that regard. The width or depth of the carrier 17 is such as to provide slide tongues 17' of adequate length to give rigid support and guidance to the carriers throughout their range of expansion-contraction movement.

The end or guide plates 13, 14 are each extended outwardly and their central, aligned, bearing bores 14' slidingly receive and guidingly support the ends of an adjusting stem 18 which is disposed within and axially of the cage-body. The adjusting stem supports at, preferably, equally spaced intervals expanding cones 19 (preferably, three, each of similar construction) which are fixedly secured to the stem as by rivets 20. The inner edge surfaces of the abrasive carriers 17 enter the center space of the cage-body. Suitable recesses are cut on the inner edges of the carriers 17 adjacent the cones 19 providing slide surfaces tapered as at 21 complementally to the taper of the cones 19 and these tapered surfaces 21 coact with the tapered surfaces of the cones (as the cones are moved back and forth) for expansion and contraction movements of the carriers as will be explained more fully hereinafter. These cones also give rigid support to the carriers 17 during the grinding or honing operation as will be well understood. The larger diameter end of each of the cones 19 is extended as at 19$^b$ and is cut away at 19$^c$ in such a way as to leave straight walled ribs 19$^d$. These ribs engage corresponding straight-walled surfaces 21$^a$ extending from the tapered surfaces 21 on the inner edge of each carrier 17 when the cones are moved to their fully-contracted position. The cut-outs 19$^c$ avoid engagement of the cones 19 with the abrasive unit which will be described hereinafter. Each cone 19 is provided with notches 19$^a$ (corresponding in number to the posts 15) which are engaged by the posts 15. This arrangement prevents turning of the stem 18 and cones during adjustment of the same, and it also strengthens and braces the comparatively long and slender cage-body against torsional strains and stresses tending to prevent twisting of the body and the abrasive carriers as the tool is rotated in operation. This feature adds to the life of the tool as well as giving assurance of a true bearing surface.

The end of the adjusting stem 18 which passes through the end plate 14 is long enough to extend beyond the extension 14$^a$ of that plate to rotatably receive a hollow, knurled adjusting knob or handle 22. The end plate extension 14$^a$ is exteriorly threaded and the adjusting knob 22 is interiorly threaded to engage the latter, so that by screwing the adjusting knob 22 inward or outward upon the extension 14$^a$ the adjusting stem 18 is moved inwardly or outwardly to adjust the cones 19 to expand, or contract, the abrasive carriers 17. The abrasive carriers are held snugly and tightly, but yieldingly, against the cones 19 by spring rings 23 engaging suitable notches in the opposite tongue-ends 17' of the carriers 17, and these spring rings upon contraction adjustment of the knob 22 (and cones 19) move the abrasive carriers inwardly in a contracting direction. The knob 22, being at the end of the tool body, projects from the end of the bearing being dressed, and it is always readily accessible and may be manipulated to adjust the tool during operation. This may be accomplished by the operator engaging the knob (in a direction opposite the direction of rotation) with his hand or a suitable object so as to retard the rotational movement of the knob as the tool rotates.

The end guide plate 13 has its extension 13$^a$ connected to a hollow driven shaft member 24 by a pin 25. This driven shaft is provided with a drive shank 26 connected thereto by a pin 27. It will be noted that the pins 25 and 27 are disposed at right angles to each other and it will be understood that there is slight play or looseness between the plate extension 13$^a$ and the driven shaft 24 and between the driven shaft 24 and its drive shank 26 providing for universal movement between the driver 28 (only partially shown) and the tool. The driver may take the form of what is commonly termed an "electric drill", or any other desired form of motive means.

One of the important features of my invention has to do with a novel form of abrasive unit which may be readily and quickly mounted upon the abrasive carrier 17 and which, when worn out, may be discarded and a new abrasive unit substituted. Specifically, the abrasive carriers are of general T-shape in cross section providing a T-shaped head 17ª (Figs. 3 and 4) which is adapted to slidingly receive an abrasive unit consisting of a metal support 29 and a strip of abrasive material 30 such as emery cloth, or the like. This head 17ª is slightly shorter than the full length of the carrier 17 so as to leave free the slide-tongues 17′ at the ends of the carrier. The abrasive support is of the length of the carrier head 17ª and it is formed to a channel-shape adapted to snugly, but slidingly, fit upon the carrier head. With the carrier slide-tongues 17′ in place in the end plate grooves 13′, the end plates are engaged by the ends of the abrasive unit thereby preventing longitudinal displacement of the abrasive unit. The abrasive material 30 is fitted snugly upon the abrasive supports 29. The sides of the abrasive supports are turned back upon themselves and the side edges of the abrasive material is clamped and securely held in place thereby. Thusly, the abrasive material will be held against displacement during the grinding operation and, even in the event of stretching of the abrasive material (due to it becoming oil-soaked, or for any other reason), it will not be displaced and the dressing operation will continue with a uniform abrading action. When the abrasive material 30 has worn so that it is not satisfactory for further use, the carrier 17 may be removed from the tool and the abrasive support slid longitudinally therefrom and a new support 29 with its abrasive material thereon substituted. The metal abrasive support 29 not only provides the foregoing advantages, but also serves to insure a solid and firm backing for the abrasive material which insures a firm and true grinding or dressing action at all times. The cut-outs 19ᶜ in the cones 19 prevent engagement of the side edges of the abrasive unit with the cones when the cones and carrier are in their fully-contracted position as hereinabove explained.

In the use of my invention, the tool and the driver for rotating the same may be stationarily supported, in which case the piston 12 is grasped in the hands of the operator and moved back and forth along the abrading surface to dress the pin bearing as illustrated in Fig. 1. In the dressing of the piston pin bearings formed in the piston bosses 11, as illustrated in Fig. 1, it will be appreciated that in certain positions of the piston upon the tool, the abrading members will not engage the bearing throughout (in both of bosses); and, unless otherwise provided against, the piston would tend to wabble (as when in the position of Fig. 1) with respect to the tool and cause an out-of-round grinding of the bearing. To guard against this and to insure the grinding of a true-round bearing, a centering or aligning cone 31 is slidingly mounted upon the driven shaft 24 (Figs. 1 and 2). When the piston is placed upon the tool, the operator manually moves the cone 31 against the outer part of the bearing as illustrated in Fig. 1. As the piston is moved back and forth upon the tool, the cone is held by the operator in that same piston-engaging position so that in the entire movement of the tool the cone together with the abrasive-engaged part of the tool serves to accurately and positively align the tool with the piston bearing being dressed.

In case the piston is stationarily supported and the tool is moved back and forth with respect thereto the operator may hold the cone 31 against the piston as indicated in Fig. 1, during which time the tool is moved back and forth through the piston bearing and through the cone, the cone and the tool-engaged surfaces insuring proper alignment of the tool.

From the foregoing the advantages to be gained by the use of my invention will be well appreciated. The use of reaming tools, by which smooth bearing surfaces cannot be formed, is eliminated and I, in turn, provide a tool which dresses or hones the bearing to a substantially smooth and uniform bearing surface whereby wear and other attendant objectionable features or conditions are reduced to a minimum. Further, a true-round bearing is insured all of which increases the efficiency of operation of the engine and insures a long life for the piston pin and its bearing. My invention further eliminates the necessity and expense of truing up, grinding, re-servicing, etc., of the abrading elements.

While I have shown only one form of my invention, it will be understood that changes in details and arrangement of parts may be made without departing from the spirit and scope of my invention as defined by the claims which follow.

I claim:

1. In a tool of the character described, a body of cage construction including end members joined together by a plurality of spaced posts providing therebetween passage-ways, abrasive carriers mounted in said passage-ways, and means for adjusting said carriers which includes a stem member disposed centrally of said body, cone-spreaders carried by said stem member and engageable with said carriers, said cone-spreaders each being notched for engagement with said posts for preventing rotation of said stem member and cone-spreaders and for bracing said body against torsional strains and stresses, and means for adjusting said stem-member longitudinally of said body to adjust said cone spreaders.

2. In a tool of the character described, a comparatively long and slender body of cage construction including end members rigidly joined together by a plurality of spaced posts providing therebetween passage-ways, abrasive carriers mounted in said passage-ways and having sliding-guidance support in said end members, and means for adjusting said carriers which includes a longitudinally adjustable stem member disposed centrally of said body and carriers, cone-spreaders fixedly carried by said stem member and engageable with said carriers, said cone-spreaders each being notched for engagement with said posts for preventing rotation of said cone-spreaders and stem and for bracing said body as a whole against torsional strains and stresses, and means for adjusting said stem-member back and forth in said body to adjust said cone-spreaders.

3. In a tool for dressing piston pin bearings, a body comprising cylindrical end plates, a plurality of equally spaced posts rigidly joining said plates together, said plates having central, aligned and elongated bores, abrasive carriers adjustably mounted in said body between said posts, means for adjusting said carriers which includes a stem having its ends guidingly supported in said both end plate bores, means for adjusting said stem longitudinally of said tool, cone-spreading means fixedly carried by said stem and engaging said carriers for expansion movement of the latter, yieldable means holding said carriers against said cone-spreading means, said cone-spreading means being so engaged with said posts that said stem and cone spreading means are fixed against movement except longitudinally of the tool.

4. In a tool of the character described, a body including end plates, means including a post for joining said end plates rigidly in spaced relation and providing a series of radial passageways, abrasive carriers adjustably mounted in said end plates and movable in said passageways, means for adjusting said carriers radially including an axially movable stem member, notched cones fixedly carried by said stem member and adapted to be engaged by said post to prevent rotation of the cones and stem member, a drive element associated with one of said end plates, and an adjusting element rotatably connected to said stem member and adjustably associated with the other of said end plates for moving said stem member axially.

5. In a tool of the character described, a body including end plates, posts joining said end plates, abrasive carriers adjustably mounted in said end plates between said posts, means for adjusting said carriers including an axially mounted stem and notched cones carried by said stem, said posts engaging notches in said cones to prevent rotation of said cones and stem and to brace said body against torsional strains and stresses, a drive element associated with one of said end plates, and an adjusting element adjustably associated with the other of said end plates and connected to said stem for moving said stem and cones back and forth for expansion and contraction movement of said carriers.

6. In a tool of the character described, a body having end members joined together to provide radial passageways, abrasive carriers slidably mounted and supported in said passageways, means for adjusting said carriers including a stem disposed axially of said body and cone-spreading means carried by said stem and acting on said carriers, a fixed threaded extension on one end member of said body, an exposed adjusting element threadedly engaging said extension and rotatably connected to said stem, and a drive member directly connected to the other end member of said body.

7. In a tool of the character described, a body having longitudinal passage-ways, abrasive carriers mounted in said passage-ways, means for adjusting said carriers comprising an axially mounted stem in said body and projecting from one end thereof, said one end of the body having an integral threaded extension, an adjusting member rotatably mounted on the projecting end of said stem and threadedly engaging said body extension for moving said stem axially of said body, means carried by said stem acting on said carriers to spread the same as said stem is moved axially in one direction, and a drive member fixedly secured to the end of said body opposite said adjusting member independently of said threaded extension.

8. In a tool of the character described, a comparatively long and slender body formed to provide separate longitudinal passage-ways extending substantially throughout the same, abrasive carriers slidingly guided and supported in said passage-ways, means for adjusting said carriers comprising an axially mounted stem in said body and projecting from one end thereof, said one end of the body having a threaded extension, an adjusting member rotatably mounted on the projecting end of said stem and threadedly engaging said body extension for moving said stem axially of said body, means carried by said stem acting on said carriers to spread the same as said stem is moved axially in one direction, means including a part of said passageway forming means preventing rotary movement of said stem as said adjusting member is rotated, and a rotary drive member on the end of said body opposite said adjusting member.

9. In a tool of the character described, a body, an abrasive carrier mounted in said body, and an abrasive unit mounted on said carrier which includes a metal support member slidably interlocked with said carrier, said slide connection constituting the sole means for securing said support member to said carrier and an abrasive material having the shape of and mounted upon and fastened to said support member, said support member serving as a firm and smooth backing for said abrasive material throughout its work engaging surface.

10. In a tool of the character described, a body, an abrasive carrier of T-shape in cross-section mounted in said body with its T-head projecting outwardly, and an abrasive unit mounted on said carrier, said unit including a metal support channeled to the shape of said carrier head to slidingly and snugly fit thereover for self-securement to said carrier, and a flexible abrasive material spread upon substantially to the shape of and fixedly secured to said support so that said support affords a firm backing therefor to provide a solid abrading surface engageable with the bearing wall to be dressed.

11. In a tool of the character described, a body, an abrasive carrier of T-shape in cross-section mounted in said body with its T-head projecting outwardly, and an abrasive unit mounted on said carrier, said unit including a metal support channeled to the shape of said carrier head to slidingly and snugly fit thereover, and a flexible abrasive material spread upon said support, the side edges of said support being turned back upon themselves to receive the side edges of said abrasive material and to secure said abrasive material to said support so that said support affords a firm backing therefor to provide a solid abrading surface engageable with the bearing wall to be dressed.

12. In a tool of the character described, an abrasive carrier having an enlarged, longitudinally-extending head portion, and an abrasive unit mounted on said carrier which comprises a metal shell shaped similarly to said head and fitting snugly and slidingly over said head by sliding the same longitudinally over said head from one end of the latter, said slide fit constituting the sole means securing said shell to said carrier, and an abrasive material resting flat upon the outer surface of said shell with its side edges secured thereto by a self-contained part of said shell, to prevent its displacement therefrom during the abrading operation, said entire unit being adapted to be discarded when worn out and a new unit substituted.

13. In a tool of the character described, a readily removable abrasive carrier having an enlarged, longitudinally-extending head portion, and an abrasive unit mounted on said carrier which comprises a metal support member shaped similarly to and adapted to snugly and slidingly fit over said head by sliding the same longitudinally over said head from either end of the latter, and a flexible abrasive material resting flat upon said support member with its side edges secured thereto by the turned back side edges of said support member to prevent its displacement therefrom during the abrading operation, said entire unit being adapted to be discarded when worn out and a new unit substituted by merely removing said carrier from the tool and sliding said support member therefrom.

14. In a tool of the character described, a body having a plurality of passageways formed therein, cylinder wall engaging members mounted in said passageways, and means for adjusting said members into engagement with the cylinder wall which includes a stem disposed centrally in said body, spreaders carried by said stem and engageable with said members, said spreaders having slide-interlock connection with the portion of said body forming said passageways to prevent rotation of said spreaders and for bracing the body against torsional strains and stresses, and means for actuating said stem to move said spreaders to expand said members.

15. In a tool of the general class described which comprises a cage-frame having end plates joined together by a plurality of posts defining a plurality of passageways, expansible and contractible members mounted in said passageways, spreader devices having wedge surfaces engaging complementally-shaped surfaces on said members, said spreaders having slide-interlock engagement with said posts for preventing rotation of said spreaders and for bracing said frame against torsional strains and stresses, and means for moving said spreaders axially to expand said members.

16. In a tool of the class described, a cage frame having end members joined together in such a manner as to provide radial passageways therein, wall-engaging members slidably mounted and supported in said passageways, means for adjusting said members including a stem and spreader devices carried thereby and acting on said members to expand the latter, an extension on one end member of said frame, an exposed adjusting element mounted on said extension and operatively connected to said stem to adjust the latter to move said spreader devices axially of said frame, a drive extension directly connected to the other of said end members, and frame support and centering means rotatably supported on said drive extension.

17. In a tool of the class described, a cage-frame having radial passageways therein, wall-engaging members mounted therein, means for adjusting said members including an axially mounted stem extending through said frame and beyond one end thereof, said one end of the frame having an extension housing said stem, an adjusting element mounted on said extension and operatively connected to said stem for movement of the latter, means carried by said stem and movable axially as said stem is moved to expand said members, a drive member fixedly secured to the end of the frame opposite said adjusting element, and frame support and centering means freely rotatable on said drive member.

HERMAN W. ZIMMERMAN.